(12) United States Patent
Yokozawa et al.

(10) Patent No.: US 8,641,176 B2
(45) Date of Patent: Feb. 4, 2014

(54) PRESSURE-REGULATING VALVE AND LIQUID DROPLET EJECTION APPARATUS

(75) Inventors: Toshihiro Yokozawa, Shiojiri (JP); Takahiro Yamashita, Matsumoto (JP); Seiji Kinoshita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 342 days.

(21) Appl. No.: 12/709,002

(22) Filed: Feb. 19, 2010

(65) Prior Publication Data

US 2010/0231661 A1 Sep. 16, 2010

(30) Foreign Application Priority Data

Feb. 26, 2009 (JP) .................................. 2009-043479

(51) Int. Cl.
*B41J 2/175* (2006.01)
*B41J 2/17* (2006.01)

(52) U.S. Cl.
USPC ............................................. 347/85; 347/84

(58) Field of Classification Search
USPC ................................. 347/84, 85, 86
See application file for complete search history.

(56) References Cited

U.S. PATENT DOCUMENTS

| 5,650,811 | A | 7/1997 | Seccombe et al. |
| 7,458,663 | B2 * | 12/2008 | Nakamura ...................... 347/84 |
| 2005/0151804 | A1 | 7/2005 | Hayashi et al. |
| 2009/0073243 | A1 | 3/2009 | Nakamura |
| 2009/0289971 | A1 * | 11/2009 | Gilson et al. .................... 347/86 |

FOREIGN PATENT DOCUMENTS

| JP | 09-011488 A | 1/1997 |
| JP | 2000-46219 A | 2/2000 |
| JP | 2002-215242 A | 7/2002 |
| JP | 2006-82538 A | 3/2006 |
| JP | 2006-142215 A | 6/2006 |

* cited by examiner

*Primary Examiner* — Jannelle M Lebron
(74) *Attorney, Agent, or Firm* — Global IP Counselors, LLP (57) ABSTRACT

A pressure-regulating valve for opening and closing, based on atmospheric pressure, a valve body provided to a communication flow passage via which a primary chamber and a secondary chamber communicate inside a valve housing, with the aid of a pressure-receiving membrane that constitutes one surface of the secondary chamber, for regulating the pressure of a liquid fed to the primary chamber via an inflow port, and for feeding the liquid from the secondary chamber via an outflow port; the pressure-regulating valve wherein a cover is provided for allowing action of the pressure-receiving membrane and for covering the pressure-receiving membrane; and the cover has light-blocking properties.

4 Claims, 7 Drawing Sheets

F I G. 1

F I G. 2

F I G. 3

F I G. 4

F I G. 5

F I G. 6

F I G. 7

PRESSURE-REGULATING VALVE AND LIQUID DROPLET EJECTION APPARATUS

CROSS-REFERENCE TO RELATED APPLICATIONS

The entire disclosure of Japanese Patent Application No. 2009-043479, filed Feb. 26, 2009 is expressly incorporated by reference herein.

BACKGROUND

1. Technical Field

The present invention relates to a liquid droplet ejection apparatus and to a pressure-regulating valve for vacuum-feeding a functional liquid to a functional droplet ejection head.

2. Related Art

A known pressure-regulating valve of this type for vacuum-feeding a functional liquid to an inkjet-type functional droplet ejection head is disclosed in Japanese Laid-open Patent Publication No. 2006-82538. This pressure-regulating valve has a primary chamber communicated with a functional liquid tank; a secondary chamber communicating with a functional droplet ejection head and composed of a diaphragm in the form of a film in which one wall surface has a pressure-receiving plate; a communication flow passage for allowing the primary chamber and the secondary chamber to communicate; and a valve body for opening and closing the communication flow passage. A shaft portion inserted through the communication flow passage so as to come in contact with the diaphragm is provided in protruding fashion to the valve body, and the valve body is opened and closed by the action of the diaphragm.

For example, when the pressure of the secondary chamber decreases in conjunction with ejection by the functional droplet ejection head, the diaphragm (pressure-receiving membrane) deforms inward, and the valve body opens via the shaft portion. When the valve body opens, the functional liquid flows in from the primary chamber, the secondary chamber is pressurized, the diaphragm returns to the original shape, and the valve body closes.

However, the diaphragm (pressure-receiving membrane), which acts at atmospheric pressure, is composed of a film in the conventional pressure-regulating valve described above, and may therefore be affected by surrounding air currents. When the diaphragm is affected by an air current, i.e., an external force other than atmospheric pressure, the deformation or action of the diaphragm is disrupted, and the opening and closing of the valve body become unstable.

SUMMARY

An object of the present invention is to provide a pressure-regulating valve and liquid droplet ejection apparatus whereby the effects of air currents on the pressure-receiving membrane can be eliminated.

The pressure-regulating valve of the present invention is a pressure-regulating valve for opening and closing, based on atmospheric pressure, a valve body provided to a communication flow passage via which a primary chamber and a secondary chamber communicate inside a valve housing, with the aid of a pressure-receiving membrane that constitutes one surface of the secondary chamber, for regulating the pressure of a liquid fed to the primary chamber via an inflow port, and for feeding the liquid from the secondary chamber via an outflow port; wherein a windbreak cover is provided for allowing action of the pressure-receiving membrane and for covering the pressure-receiving membrane via space that is communicated with the atmosphere.

Through this configuration, even when an ambient air current is present, since the windbreak cover blocks air currents, the pressure-receiving membrane is not affected by the ambient air current. The deformation or action of the pressure-receiving membrane can therefore be prevented from being disrupted by air currents, and the opening and closing of the valve body can be stabilized. Since the pressure-receiving membrane is also provided with a windbreak cover via a space that communicates with the atmosphere, the inside of the windbreak cover is not sealed, atmospheric pressure can be maintained, and the pressure-receiving membrane is stably operated by the pressure fluctuation inside the secondary chamber. Normal deformation or action of the pressure-receiving membrane by the pressure fluctuation inside the secondary chamber can thereby be maintained without being affected by external conditions other than the atmospheric pressure, and the functional liquid can be appropriately fed to the functional droplet ejection head.

Preferably, the windbreak cover in this case is formed in the shape of a cap using a covering wall portion that faces the pressure-receiving membrane, and a peripheral wall portion that extends to the covering wall portion, and the windbreak cover is detachably attached to the valve housing.

Through this configuration, the windbreak cover can be installed as needed when the effects of ambient air currents are considered. The windbreak cover is also in the shape of a cap, and is therefore easy to remove. When there is a need to observe whether air is present inside the secondary chamber on the other side of the pressure-receiving membrane, it is preferred that at least the covering wall portion be composed of a light-transmitting material. When a functional liquid that is degraded by ultraviolet rays or the like is used, the windbreak cover is preferably composed of a light-blocking material.

A communication hole that communicates with the atmosphere is preferably formed in the peripheral wall portion in this case.

Through this configuration, atmospheric pressure can be maintained inside the windbreak cover while air currents are blocked. Normal deformation or action of the pressure-receiving membrane can thereby be maintained. The communication hole may be of any size, and any number of communication holes may be formed insofar as pressure loss can be reduced to a degree that the action of the pressure-receiving membrane is unaffected.

In this case, preferably, a functional liquid fed from functional liquid feeding means via the inflow port is adjusted for pressure, and fed to an inkjet-type functional droplet ejection head via the outflow port.

Through this configuration, the functional liquid of the functional liquid feeding means can be depressurized to the appropriate pressure and fed to the functional droplet ejection head regardless of the difference in hydraulic head between the functional liquid feeding means and the functional droplet ejection head.

The liquid droplet ejection apparatus of the present invention includes the pressure-regulating valve described above, the functional liquid feeding means, and the functional droplet ejection head, wherein a functional liquid is ejected onto a workpiece and drawing is performed while the functional droplet ejection head is moved relative to the workpiece.

Through this configuration, since the pressure-regulating valve can be operated stably and with good precision without being affected by external conditions other than atmospheric pressure, the functional droplet ejection head can be appropriately driven, and the quality of drawing on the workpiece can be enhanced.

DETAILED DESCRIPTION OF EXEMPLARY EMBODIMENTS

A liquid droplet ejection apparatus provided with the pressure-regulating valve of the present invention will be described with reference to the accompanying drawings. This liquid droplet ejection apparatus is incorporated into a flat-panel display manufacturing line and uses a functional droplet ejection head into which a specialized ink or luminescent resin liquid is introduced as a functional liquid, and the liquid droplet ejection apparatus forms color filters of a liquid crystal display device or luminescent elements or the like as pixels of an organic EL display. A pressure-regulating valve vacuum-feeds the functional liquid at a constant pressure to the functional droplet ejection head.

Figure 1:
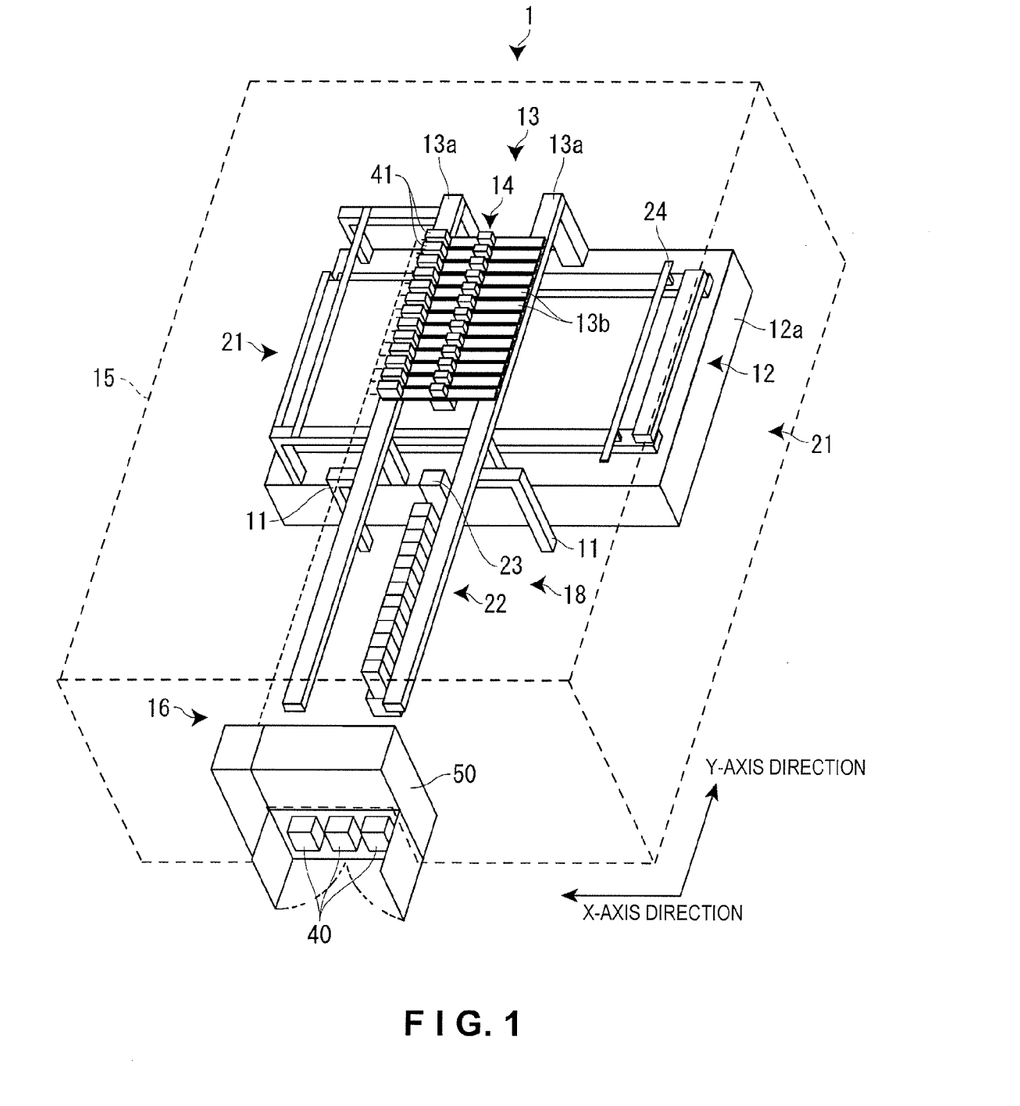
FIG. 1 is a perspective view showing the liquid droplet ejection apparatus.

As shown in FIG. 1, the liquid droplet ejection apparatus 1 is composed of an X-axis table 12 for moving a workpiece in the X-axis direction, the X-axis table 11 extending in the X-axis direction as the primary scanning direction and being provided on an X-axis support base 12a supported by a hard surface; a Y-axis table 13 extending in the Y-axis direction as a secondary scanning direction and being provided on a pair of Y-axis support bases 13a that are suspended over the X-axis table 12 via a plurality of support columns 11; and thirteen carriage units 14 in which a plurality of (twelve) functional droplet ejection heads 25 is mounted; and the thirteen carriage units 14 are suspended by the Y-axis table 13 so as to be able to move. The liquid droplet ejection apparatus 1 is further provided with a chamber 15 for housing the abovementioned devices in a temperature- and humidity-controlled atmosphere, and a functional liquid feeding unit 16 (functional liquid feeding means) running through the chamber 15 for feeding functional liquid to the functional droplet ejection heads 25. The liquid droplet ejection apparatus 1 is controlled overall by a control device (not shown in the drawing), and by driving the ejection of the functional droplet ejection heads 25 synchronously with the driving of the X-axis table 12 and the Y-axis table 13, six colors of functional droplets fed from the functional liquid feeding unit 16 are ejected, and a predetermined drawing pattern is drawn on the workpiece W.

The liquid droplet ejection apparatus 1 is also provided with a maintenance device 18 that has a flushing unit 21, a suction unit 22, a wiping unit 23, and an ejection performance detection unit 24. These units are provided to maintain the functional droplet ejection heads 25 and enable the functioning of the functional droplet ejection heads 25 to be maintained and restored.

Figure 2:
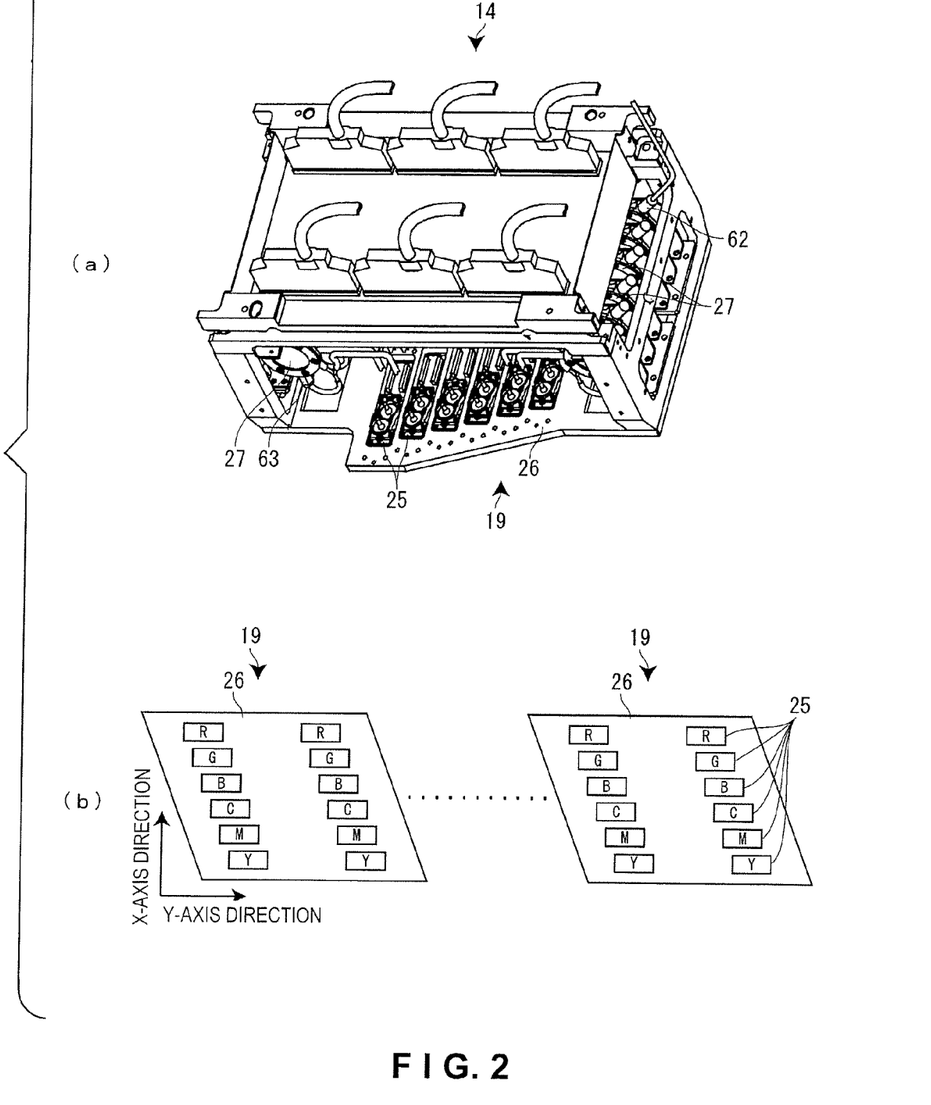
FIG. 2(a) is a perspective view showing the carriage unit (head unit) mounted in the liquid droplet ejection apparatus.
FIG. 2(b) is a schematic plan view showing the head unit in which the functional droplet ejection heads are mounted.

As shown in FIG. 2, the carriage units 14 are each provided with a head unit 19 having two functional droplet ejection heads 25 for each of six colors R, G, B, C, M, and Y (twelve functional droplet ejection heads 25 in total), a head plate 26 for supporting the twelve functional droplet ejection heads 25 so that the functional droplet ejection heads 25 are divided into two groups of six heads each, and pressure-regulating valves 27 for feeding the functional liquid to the functional droplet ejection heads 25 on the basis of atmospheric pressure. Each of the carriage units 14 is suspended from a bridge plate 13b suspended on the pair of Y-axis support bases 13a (see FIG. 1). The carriage units 14 are configured so that functional liquid is fed to the functional droplet discharge heads 25 via the pressure-regulating valves 27 using the natural head pressure from sub tanks 41 that are provided on the bridge plates 13b. The number of carriage units 14 is arbitrary, as well as the number of functional droplet discharge heads 25 mounted in each of the carriage units 14.

Figure 3:
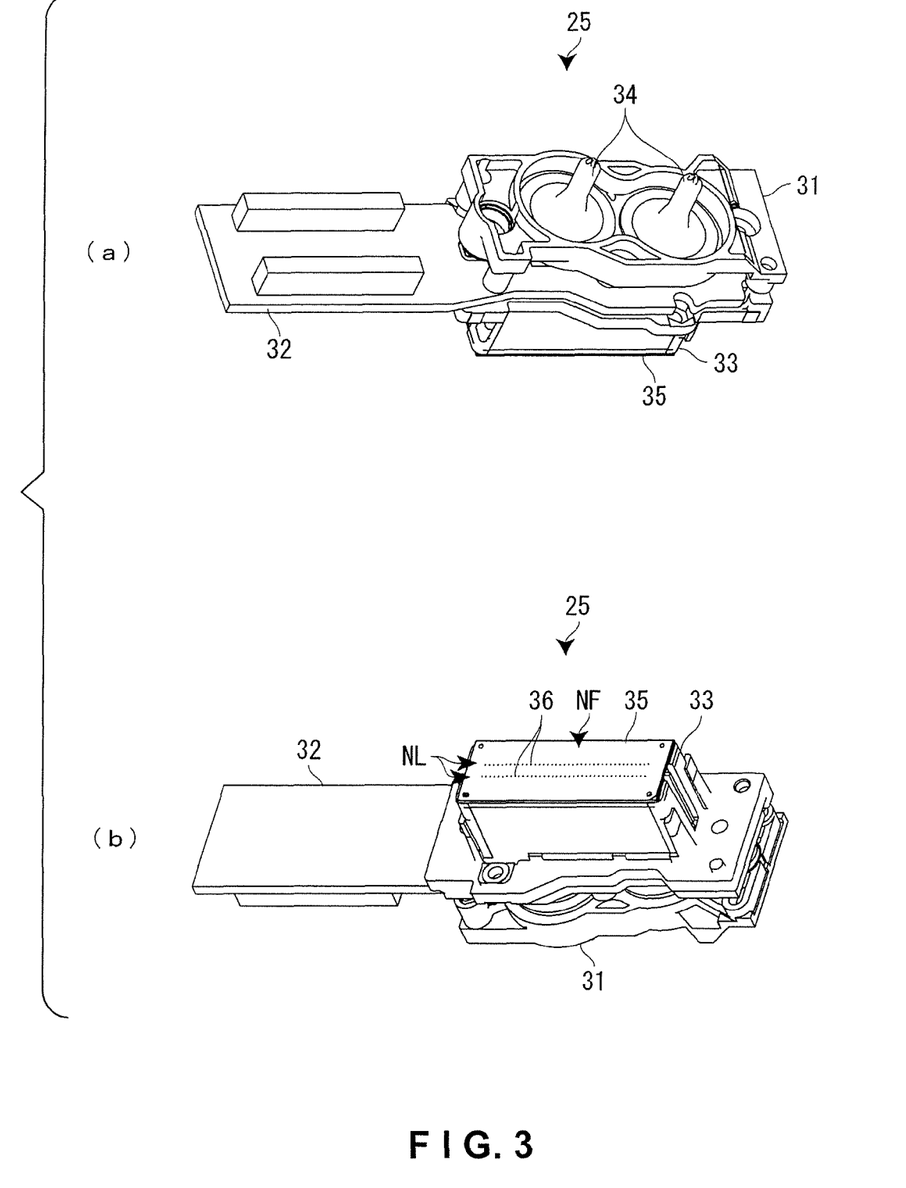
FIG. 3 is an external perspective view showing the front and back of the functional droplet ejection head.

As shown in FIG. 3, the functional droplet discharge head 25 is a so-called double inkjet head, and is provided with a functional liquid introduction part 31 having two connecting pins 34; a double head substrate 32 that is connected to the side of the functional liquid introduction part 31; a double pump part 33 extending downward from the head substrate 32; and a nozzle plate 35 extending to the pump part 33. A portion of a head-side tube 43 described hereinafter is connected to the functional liquid introduction part 31, two nozzle rows NL are provided parallel to each other in the nozzle surface NF of the nozzle plate 35, and each of the nozzle rows NL is composed of 180 ejection nozzles 36 arranged at an equal pitch. The abovementioned control device is connected to the head substrate 32 via a flexible flat cable (not shown), and a drive waveform outputted from the control device is applied to each pump part 33, whereby functional liquid is ejected from the ejection nozzles 36.

Figure 4:
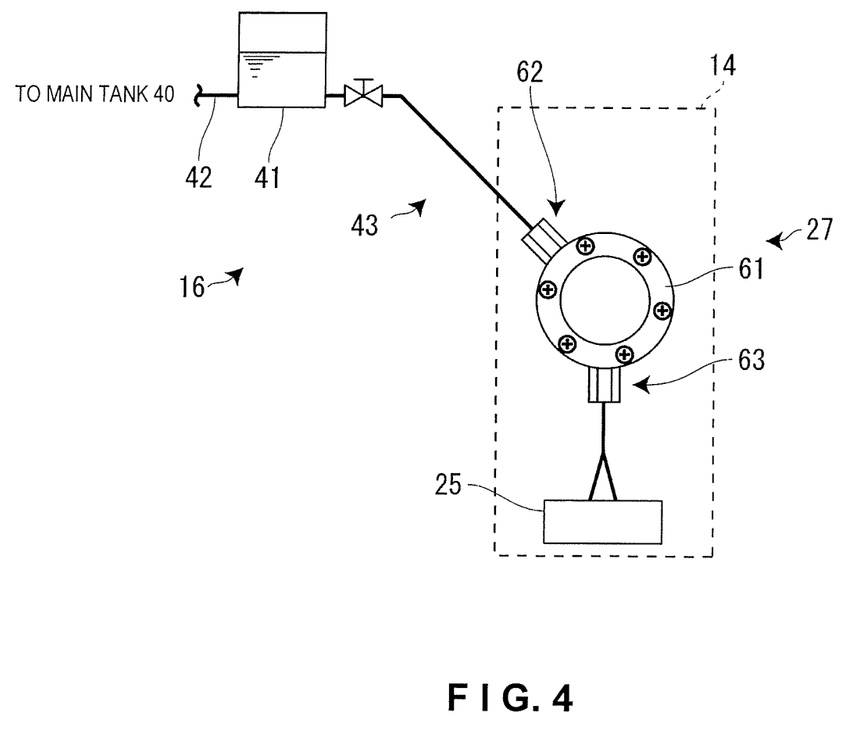
FIG. 4 is a schematic system diagram showing the functional liquid feeding unit.

As shown in FIGS. 1 and 4, the functional liquid feeding unit 16 is provided with six (six colors of) main tanks 40 housed in a tank cabinet 50 that also serves as the chamber 15; a plurality of (thirteen) sub tanks 41 provided on the bridge plates 13b; tank-side tubes 42 for connecting the main tanks 40 and the plurality of sub tanks 41; and a plurality of head-side tubes 43 for connecting the sub tanks 41 and the functional droplet ejection heads 25. The functional droplet ejection heads 25 and the pressure-regulating valves 27 mounted in the carriage units 14 are inserted in the head-side tubes 43.

The functional liquid fed from the main tanks 40 passes through the tank-side tubes 42, and is stored in the sub tanks 41. The functional liquid of the sub tanks 41 is fed at the natural head pressure to the functional droplet ejection heads 25 via the head-side tubes 43 and the pressure-regulating valves 27 according to the driving the functional droplet ejection heads 25.

Figure 5:
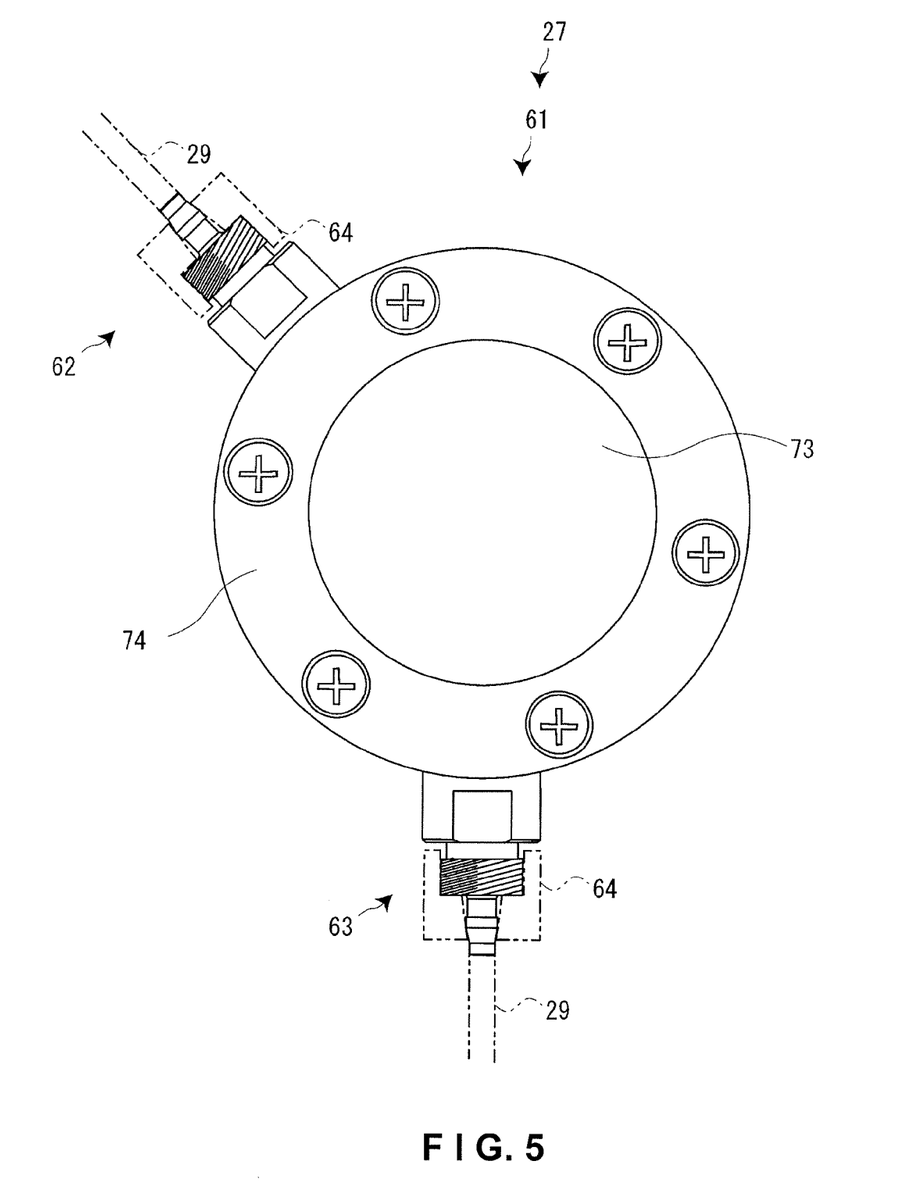
FIG. 5 is a plan view from the secondary-chamber side of the pressure-regulating valve.
Figure 6:
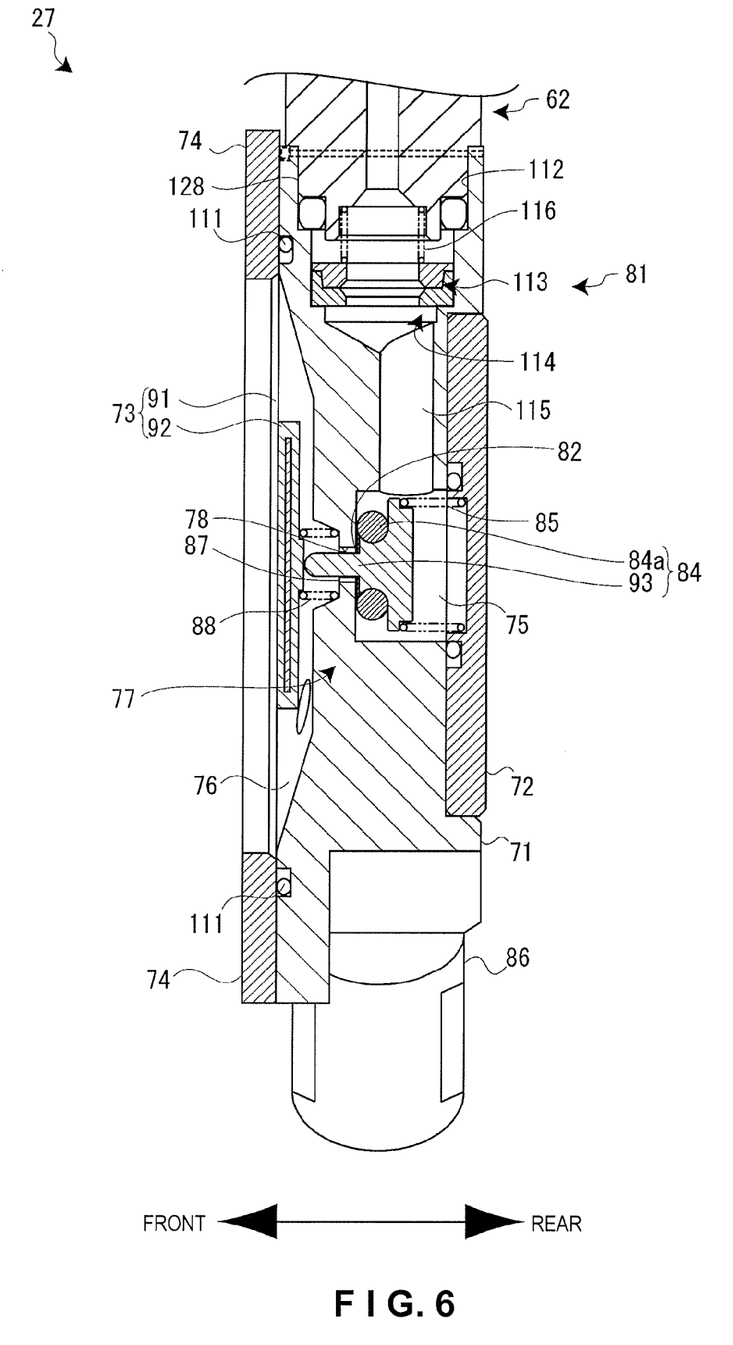
FIG. 6 is a longitudinal sectional view showing the pressure-regulating valve cut in the axial direction of the inflow port.

The pressure-regulating valve 27 according to the present embodiment will next be described with reference to FIGS. 5 and 6.

The pressure-regulating valve 27 is provided with a regulating valve main body 61 as the main component, an inflow connector 62 socket-joined to the inflow side of the regulating valve main body 61, and an outflow connector 63 socket-joined to the outflow side of the regulating valve main body

61. A tube 29 connected to a sub tank 41 not shown in the drawing is connected to the inflow connector 62 via a presser nut 64, and a tube 29 connected to a functional droplet ejection head 25 not shown in the drawing is connected in the same manner to the outflow connector 63 via a presser nut 64.

The regulating valve body 61 is substantially discoid, and is composed of a valve housing 71 in which a depression is formed in the center of the front surface and rear surface thereof; a cover 72 for partitioning the valve housing 71 and a primary chamber 75; and a membrane presser member 74 for partitioning the valve housing 71 and a secondary chamber 76 by fixing a pressure-receiving membrane 73 to the valve housing 71. The primary chamber 75 and the secondary chamber 76 are provided on the same axis via a barrier 77 that forms a portion of the valve housing 71, and a communication flow passage 78 for communicating the primary chamber 75 and the secondary chamber 76 is formed through the center (axial center) of the barrier 77.

The membrane presser member 74 and the cover 72 are screwed (not shown in the drawing) onto the valve housing 71 so as to hold the valve housing 71 from the front and rear, and each has a circular shape concentric with the axis line through the center of the pressure-receiving membrane 73. The valve housing 71 and the membrane presser member 74 abutting each other are joined in liquid-tight fashion so as to sandwich a seal ring 111 and the peripheral edge portion of the pressure-receiving membrane 73.

The primary chamber 75 is formed by the rear surface of the valve housing 71 having the barrier 77 as the main body thereof, and the cover 72 for closing the open end of the valve housing 71. An inflow port 81 extending at an angle in the radial direction from the primary chamber 75 is formed at the top of the primary chamber 75, and an edge of the primary-chamber-side opening 82 connected to the communication flow passage 78 is formed in the center of the primary chamber 75. A valve body 84 for opening and closing the communication flow passage 78 from the side of the primary chamber 75 faces the edge of the primary-chamber-side opening 82, while correspondingly, a valve seat against which the valve body 84 moves is formed by the edge of the primary-chamber-side opening 82. The valve body 84 is weakly urged in the closing direction (toward the secondary chamber 76) by a valve body urging spring 85 provided between the valve body 84 and the cover 72.

The inflow port 81 is composed of a joint bearing portion 112 in which the inflow connector 62 is socket-joined; a filter accommodating part 114 for accommodating a filter 113, the filter accommodating part 114 being connected to the joint bearing portion 112; and an inflow passage 115 for communicating the filter accommodating part 114 and the primary chamber 75. A connection opening 128 of the inflow connector 62 is socket-joined in the joint bearing portion 112. The filter 113 is accommodated in the filter accommodating part 114 in a state of being urged by a presser bar spring 116 provided via the inflow connector 62. The inflow passage 115 is formed on the side of the primary chamber 75 with respect to the inflow port 81.

The secondary chamber 76 is formed by the front surface of the valve housing 71, and the pressure-receiving membrane 73 for closing the open end of the valve housing 71, and the pressure-receiving membrane 73 is attached to the valve housing 71 by the membrane presser member 74 via the seal ring 111. An outflow port 86 extending directly downward from the secondary chamber 76 is formed at the bottom of the secondary chamber 76, and a secondary-chamber-side opening 87 connected to the communication flow passage 78 is formed in the center of the secondary chamber 76. A membrane urging spring 88 for urging the pressure-receiving membrane 73 in the forward direction is also provided between the pressure-receiving membrane 73 described hereinafter and the peripheral edge of the secondary-chamber-side opening 87.

The pressure-receiving membrane 73 is composed of a membrane body 91 made of a resin film, and a resin pressure-receiving plate 92 bonded to the center portion of the membrane body 91. The pressure-receiving plate 92 is formed concentric with the membrane body 91 and having an adequately small diameter with respect to the membrane body 91, and the valve body 84 comes in contact with the center of the pressure-receiving plate 92.

The valve body 84 is provided with a ring-shaped valve main body 84a composed of a flexible material for functioning as a valve, and a valve holder 93 for holding the valve main body 84a. The valve main body 84a opens and closes the communication flow passage 78 by separating from and contacting the edge of the primary-chamber-side opening 82 as the valve seat. The distal end of the valve holder 93 extends through the communication flow passage 78, and the distal end comes in contact with the pressure-receiving plate 92 so as to open and close the valve.

The outflow port 86 has the same form as the inflow port 81, and is composed of a joint bearing portion 112 in which the outflow connector 63 is socket-joined; and an outflow passage (not shown) for communicating the joint bearing portion 112 and the secondary chamber 76. A connection opening 128 of the outflow connector 63 is socket-joined in the joint bearing portion 112. The inflow port 81 and the outflow port 86 differ with respect to the direction of flow of the functional liquid and the presence of the filter 113, but have the same basic structure of the connecting portions thereof.

In the liquid droplet ejection apparatus 1 of the present embodiment, the functional liquid feeding unit 16 for feeding the functional liquid to the functional droplet ejection heads 25 via the pressure-regulating valve 27 is housed in an atmosphere-controlled chamber 15. Besides the functional liquid feeding unit 16, the X-axis table 12, the Y-axis table 13, and other components that generate heat are also housed within the chamber 15. Air currents therefore occur in portions of the chamber 15, and may affect the action of the pressure-receiving membrane 73 of the pressure-regulating valve 27. Measures such as those described below are therefore taken in the pressure-regulating valve 27 in the present embodiment.

Figure 7:
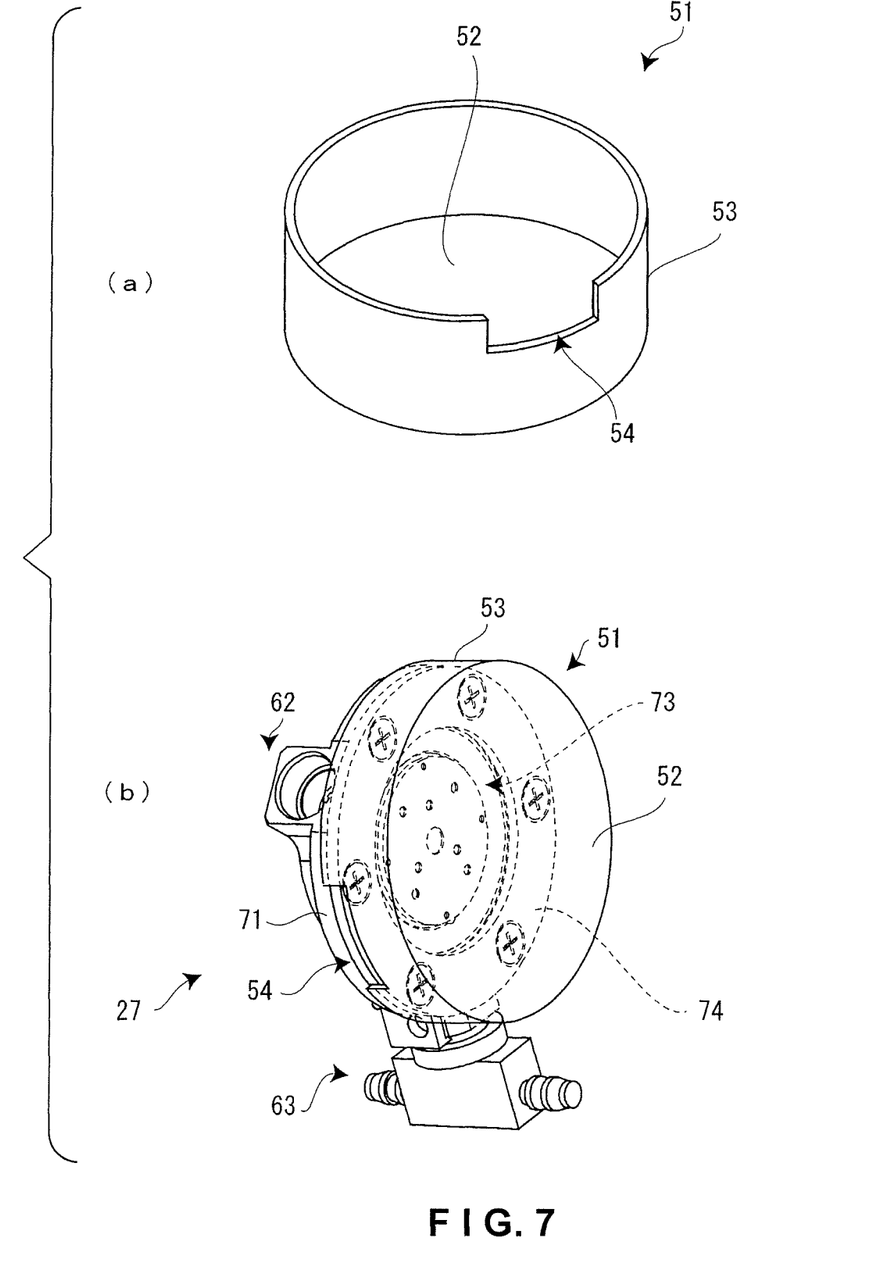
FIG. 7(a) is an external perspective view showing the windbreak cover.
FIG. 7(b) is an external perspective view from the secondary-chamber side of the pressure-regulating valve on which the windbreak cover is installed.

The windbreak cover 51 attached to the pressure-regulating valve 27 on the side of the secondary chamber 76 thereof will be described with reference to FIG. 7. As shown in FIG. 7(a), the windbreak cover 51 is composed of a transparent material (e.g., polyethylene terephthalate, glass, polypropylene, or the like) having solvent-resistant properties, for example, in which a covering wall portion 52 that faces the pressure-receiving membrane 73, and a peripheral wall portion 53 that extends to the external periphery of the covering wall portion 52 are integrally formed in the shape of a cap. The peripheral wall portion 53 of the windbreak cover 51 has an open diameter substantially the same as that of the membrane presser member 74 described above, and this portion of the windbreak cover 51 is detachably attached to the front surface (on the secondary chamber 76 side) of the valve housing 71. Although not shown in the drawing, a plurality of small projections for aiding in attachment is provided to the inner surface of the windbreak cover 51. At least one communication hole 54 allowing communication to the atmosphere is provided to the peripheral wall portion 53. The communication hole 54 in this case is composed of a cut-out portion that is formed on the opening side of the peripheral wall portion 53. The communication hole 54 may also be composed of one or more small holes formed in the peripheral wall portion 53.

As shown in FIG. 7(b), the windbreak cover 51 is detachably attached to the valve housing 71 so as to cover the secondary chamber 76 side thereof, and in this state, half of the cut-out portion is covered by the valve housing 71, and the cut-out portion functions as the communication hole 54. In this case, the windbreak cover 51 is attached by placing the external peripheral edge of the membrane presser member 74 inside the peripheral wall portion 53 of the windbreak cover 51 so that the entire valve housing 71 is capped from the side of the secondary chamber 76. Since the cut-out portion that forms the communication hole 54 opens slightly during attachment of the windbreak cover 51, the windbreak cover 51 can be smoothly installed. The windbreak cover 51 can also be easily removed by using the communication hole 54 provided to the peripheral wall portion 53 as a handle to pull the windbreak cover 51. The windbreak cover 51 is composed of a transparent material in the present embodiment, but this configuration is not limiting, and when a functional liquid having low light resistance, for example, is used, a stainless steel or other metal windbreak cover 51 can be used to prevent the functional liquid from degrading.

The shape of the windbreak cover 51 is also not limited to being cylindrical, and the windbreak cover 51 may have a truncated conical shape or other shape. The structure for attaching the windbreak cover 51 may be the snap-in structure of the present embodiment, or a screw structure insofar as the windbreak cover 51 can be reliably attached to the valve housing 71.

According to the configuration described above, by attaching the windbreak cover 51 to the secondary chamber 76 side of the pressure-regulating valve 27 as needed, the pressure-receiving membrane 73 can be acted upon by pressure fluctuations inside the secondary chamber 76 without being affected by ambient air currents, and the functional liquid can be stably fed to the functional droplet ejection heads 25.

What is claimed is:

1. A pressure-regulating valve for opening and closing a valve body provided to a communication flow passage via which a primary chamber and a secondary chamber communicate inside a valve housing, with the aid of a pressure-receiving membrane that constitutes one surface of the secondary chamber, for regulating the pressure of a liquid fed to the primary chamber via an inflow port, and for feeding the liquid from the secondary chamber via an outflow port, wherein
   a cover for allowing action of the pressure-receiving membrane covers an entirety of the pressure-receiving membrane from one side of the pressure-receiving membrane,
   the cover is formed in the shape of a cap using a covering wall portion that faces the pressure-receiving membrane, and a peripheral wall portion that extends to the covering wall portion,
   the cover is detachably attached to the valve housing,
   the cover has a communication hole for communicating to atmosphere, the communication hole being formed in the peripheral wall portion, and
   the cover has light-blocking properties.

2. The pressure-regulating valve according to claim 1, wherein
   the cover is made of metal.

3. The pressure-regulating valve according to claim 1, wherein
   a functional liquid fed from functional liquid feeding means via the inflow port is adjusted for pressure, and fed to an inkjet-type functional droplet ejection head via the outflow port.

4. A liquid droplet ejection apparatus comprising:
   the pressure-regulating valve according to claim 3;
   the functional liquid feeding means; and
   the functional droplet ejection head, wherein
   a functional liquid is ejected onto a workpiece and drawing is performed while the functional droplet ejection head is moved relative to the workpiece.

* * * * *